(12) United States Patent
Sharma et al.

(10) Patent No.: US 9,853,903 B1
(45) Date of Patent: Dec. 26, 2017

(54) SIMULTANEOUS REDIRECTING AND LOAD BALANCING

(71) Applicant: CISCO TECHNOLOGY, INC., San Jose, CA (US)

(72) Inventors: Samar Sharma, San Jose, CA (US); Mouli Vytla, San Jose, CA (US); Rajendra Kumar Thirumurthi, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 124 days.

(21) Appl. No.: 14/731,242

(22) Filed: Jun. 4, 2015

Related U.S. Application Data

(60) Provisional application No. 62/151,997, filed on Apr. 23, 2015.

(51) Int. Cl.
| | | |
|---|---|---|
| *H04L 12/819* | (2013.01) | |
| *H04L 12/741* | (2013.01) | |
| *H04L 12/721* | (2013.01) | |
| *H04L 12/801* | (2013.01) | |

(52) U.S. Cl.
CPC .............. *H04L 47/21* (2013.01); *H04L 45/38* (2013.01); *H04L 45/74* (2013.01); *H04L 47/12* (2013.01)

(58) Field of Classification Search
None
See application file for complete search history.

(56) References Cited

U.S. PATENT DOCUMENTS

| | | | |
|---|---|---|---|
| 5,951,694 A | 9/1999 | Choquier et al. | |
| 6,950,400 B1* | 9/2005 | Tran | H04L 47/10 370/236 |
| 7,055,173 B1* | 5/2006 | Chaganty | H04L 41/0654 726/11 |
| 8,190,881 B2* | 5/2012 | Wang | H04L 63/08 713/154 |
| 9,270,592 B1* | 2/2016 | Sites | H04L 45/7453 |
| 2003/0056001 A1* | 3/2003 | Mate | H04L 49/9073 709/238 |
| 2006/0053424 A1 | 3/2006 | Koistinen et al. | |
| 2009/0262741 A1* | 10/2009 | Jungck | H04L 29/12066 370/392 |
| 2012/0059934 A1 | 3/2012 | Rafiq et al. | |
| 2013/0294239 A1* | 11/2013 | Szabo | H04L 47/10 370/235 |
| 2014/0233399 A1* | 8/2014 | Mann | H04L 41/0806 370/248 |
| 2016/0234112 A1* | 8/2016 | Anand | H04L 45/00 |

* cited by examiner

*Primary Examiner* — Charles C Jiang
*Assistant Examiner* — Rose Clark
(74) *Attorney, Agent, or Firm* — Polsinelli PC

(57) ABSTRACT

The present disclosure describes methods and systems for enabling simultaneous redirection and load-balancing of data packets to network elements in a network environment. In one embodiment, a data packet is received at a network element. The network element identifies a traffic bucket corresponding to the data packet. The traffic bucket includes a matching criterion that identifies a subset of network traffic to map to a node. The data packet is redirected, based on the traffic bucket, from a first address contained in a field of the data packet to a second address that corresponds to the node. The data packet is forwarded to the second address.

20 Claims, 5 Drawing Sheets

SIMULTANEOUS REDIRECTING AND LOAD BALANCING

CROSS-REFERENCE TO RELATED APPLICATIONS

This application claims the benefit of priority under 35 U.S.C. §119(e) to U.S. Provisional Application Ser. No. 62/151,997, entitled "SIMULTANEOUS REDIRECTING AND LOAD BALANCING" filed Apr. 23, 2015, which is hereby incorporated by reference in its entirety.

TECHNICAL FIELD

This disclosure relates in general to the field of communications and, more particularly, to enabling simultaneous redirection and load-balancing in a network environment.

BACKGROUND

Some network traffic may require special handling (e.g., such as inspection). The network traffic, for example, may include one or more data packets (or packets) containing control information and data. A network element may redirect the network traffic to a device or line-card for the special handling. As an example, the network element may include one or more ingress ports and one or more egress ports. The network element may receive network traffic through the ingress ports. The network element may perform various operations on the network traffic to forward the network traffic on to one or more devices coupled to the network element.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1A:
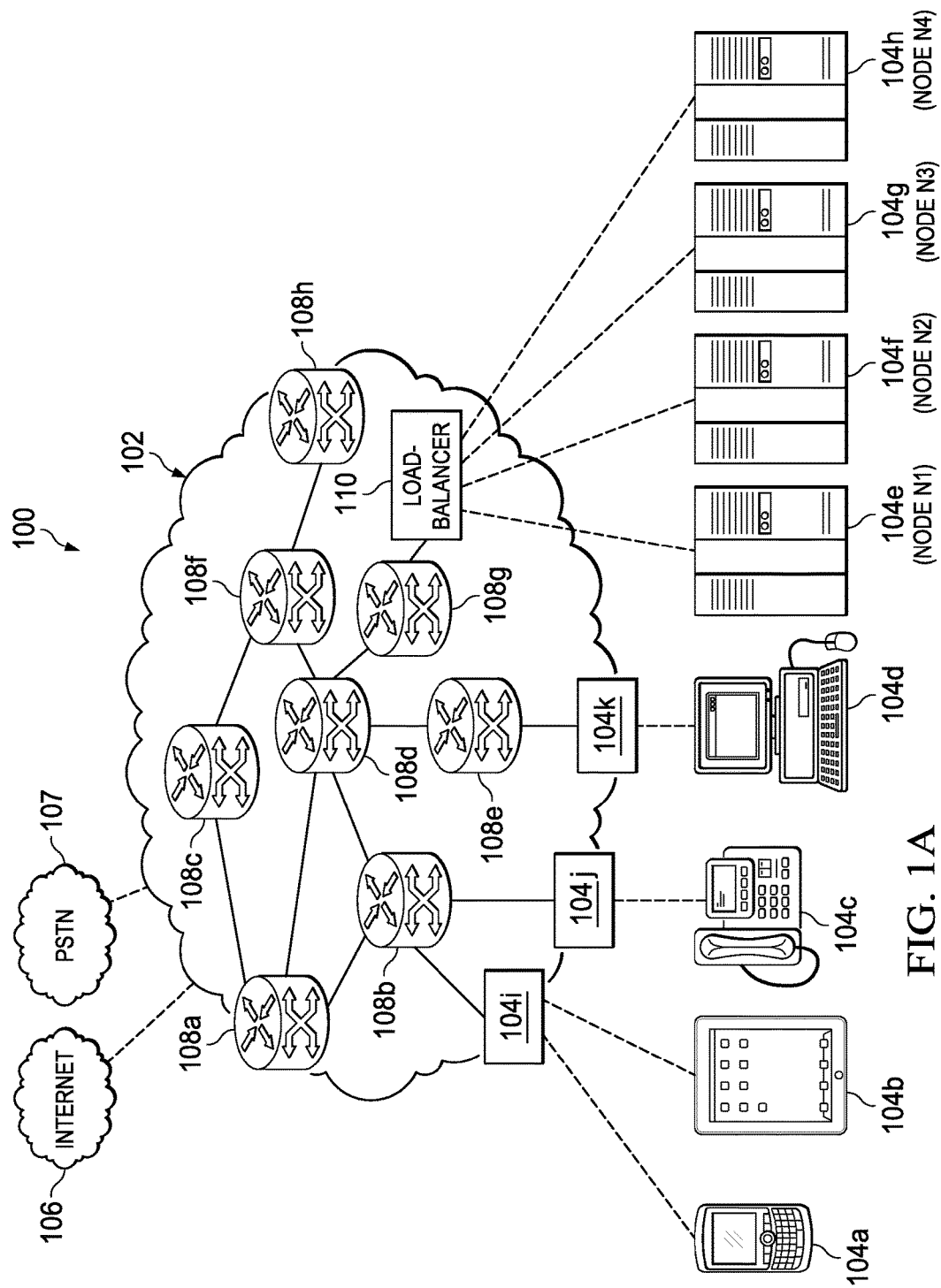
FIG. 1A illustrates a block diagram of a system 100 for separately redirecting and load-balancing network traffic in accordance with certain embodiments.

The present disclosure describes methods and systems for enabling simultaneous redirection and load-balancing of data packets to network elements in a network environment.

In some embodiments, a method comprises a data packet being received at a network element. The network element identifies a traffic bucket corresponding to the data packet. A 'traffic bucket' is inclusive of any data representative of a portion of network traffic. In a particular example, a plurality of traffic buckets corresponds to mutually exclusive and collectively exhaustive partitions of the network traffic received by the network element. The traffic bucket may comprise one or more matching criterion that classifies, describes, or otherwise identifies the subset of network traffic (e.g., identifies one or more attributes of a packet that corresponds to the traffic bucket). The traffic bucket may be associated with a node. The data packet is redirected, based on the traffic bucket, from a first address contained in a field of the data packet to a second address that corresponds to the node. The data packet is forwarded to the second address.

In other embodiments, an apparatus comprises at least one memory element to store a plurality of forwarding entries, at least one processor operably coupled to the at least one memory, and a load-balancing and redirection manager that comprising one or more instructions. When the one or more instructions are executed by at least one processor, the at least one processor is configured to perform one or more operations comprising: receiving a data packet; identifying, based on the plurality of forwarding entries, a traffic bucket corresponding to the data packet, wherein the traffic bucket includes a matching criterion that identifies a subset of network traffic to map to a node; redirecting, based on the traffic bucket, the data packet from a first address contained in a field of the data packet to a second address that corresponds to the node; and forwarding the data packet to the second address.

In still other embodiments, a computer-readable non-transitory medium comprises one or more instructions. The one or more instructions, when executed on a processor, configure the processor to perform one or more operations. The one or more operations may comprise receiving, at a network element, a data packet. The one or more operations may further comprise identifying, by the network element, a traffic bucket corresponding to the data packet, wherein the traffic bucket includes a matching criterion that identifies a subset of network traffic to map to a node. In addition, the one or more operations may comprise redirecting, based on the traffic bucket, the data packet from a first address contained in a field of the data packet to a second address that corresponds to the node. Moreover, the one or more operations may comprise forwarding the data packet to the second address.

Example Embodiments

In some systems, when network traffic requires special handling, the network traffic may be redirected from a network element to a specific node to implement the special handling. However, in cases where the network traffic is of a high bandwidth, multiple nodes may be utilized to implement the special handling. However, splitting the network traffic between the multiple nodes may further require balancing a portion of the network traffic that is distributed to each of the multiple nodes (e.g., load-balancing). In such cases, a load-balancer can be placed between the network element and the nodes. However, because this requires the addition of another device (i.e., the load-balancer), such a solution may be costly and/or require additional time to configure the load-balancer to comply with network policies.

FIG. 1A illustrates a block diagram of a system 100 for redirecting and load-balancing network traffic in accordance with certain embodiments. System 100 includes various network nodes 104a-k coupled to network elements 108a-h in network 102. In operation, each network elements 108a-h may forward network traffic (e.g., data packets) from one or more network nodes 104a-k to one or more others of the network nodes 104a-k. The network element 108g may redirect network traffic to a load-balancer 110. The load-balancer 110 may load-balance the network traffic and distribute portions of the network traffic to one of the nodes 104e-h. In this example, the redirection is separate from the load-balancing (i.e., the network element 108g redirects the traffic and, separately, the load-balancer 110 load-balances the traffic).

As an illustrative example, the network traffic could be 800 GB of network traffic that is to be inspected. In such an example, an ingress port-channel interface may include 8×100 GB member ports forming the port-channel. A network element may receive the network traffic over the ingress port-channel and may be coupled to a set of inspection devices, each connected to the network element by a 10 GB egress interface. Redirecting the 800 GB of network traffic to the set of inspection devices would require grouping 80×10 GB interfaces. However, existing load splitting techniques do not allow such a grouping. For example, neither Port-Channel nor Equal Cost Multipath (ECMP) allows grouping 80 interfaces and may only allow groupings of up to 16 nodes/devices. Thus, the limitations of load splitting techniques may require that the network traffic be redirected to a load-balancer for subsequent load-balancing to a set of nodes.

Figure 1B:
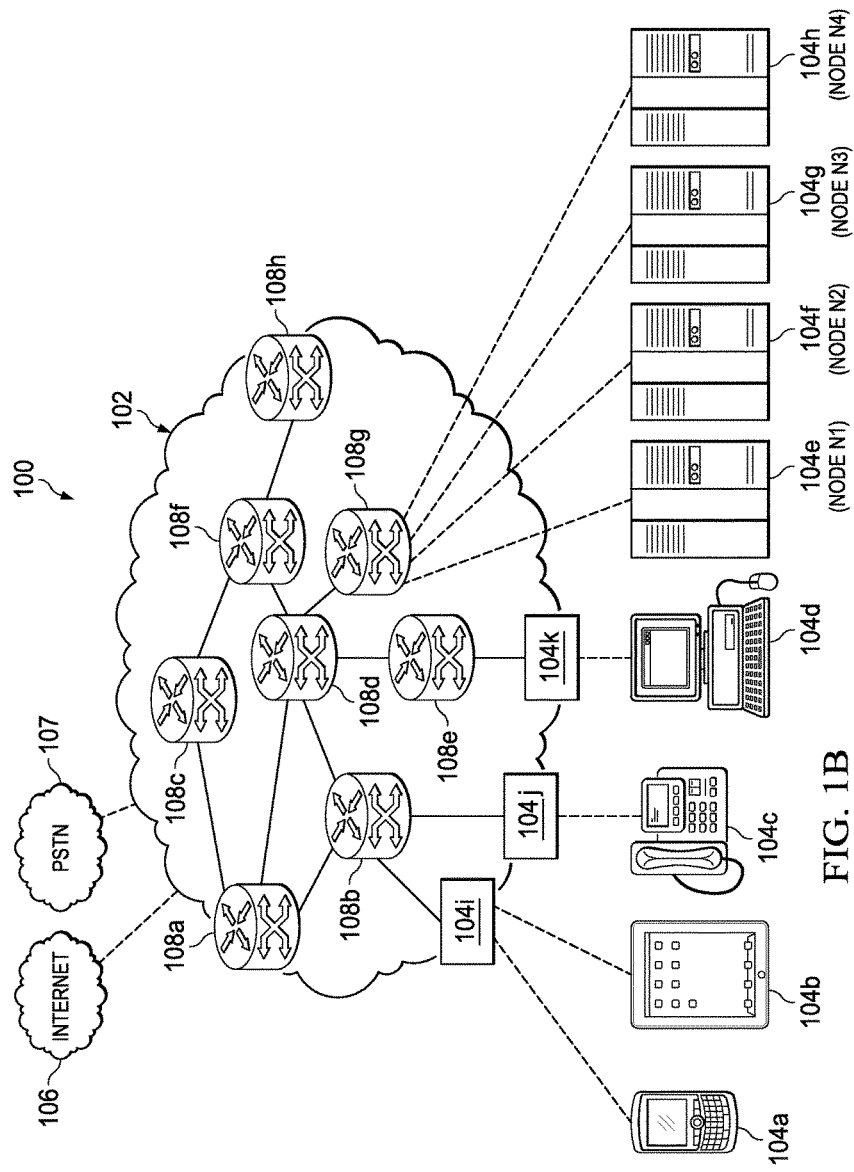
FIG. 1B illustrates a block diagram of a system 100 for simultaneously redirecting and load-balancing network traffic in accordance with certain embodiments.

The methods, systems, and apparatuses (disclosed herein) provide a solution to the above problems (and others) by simultaneously redirecting and load-balancing network traffic. Such simultaneous redirecting and load-balancing enables, for example, a single network element to redirect high bandwidth network traffic (e.g., including multi-terabit network traffic) to a set of nodes while balancing the load distributed to each node in the set of nodes. Turning to FIG. 1B, FIG. 1B illustrates a block diagram of system 100 for redirecting and load-balancing network traffic in accordance with certain embodiments. The components of FIG. 1B are similar to those in FIG. 1A and are not repeated here only for the purpose of brevity. A difference between the figures is that the system of FIG. 1A includes the load-balancer 110, while FIG. 1B does not. In FIG. 1B, the network element 108g simultaneously redirects and load-balances network traffic (e.g., to the nodes 104e-h). Thus, in contrast to FIG. 1A, the redirection is combined with the load-balancing in FIG. 1B. The network element 108g (in FIG. 1B) may filter data packets by controlling, based on one or more traffic buckets, whether the data packets are permitted or denied.

A 'traffic bucket' is inclusive of any data representative of a portion of network traffic. For example, a traffic bucket may comprise at least one matching criterion (or matching criteria) that classifies, describes, and/or identifies (or is usable to identify) a subset of network traffic. Note that the terms 'traffic bucket' and 'bucket' are used interchangeably throughout the present disclosure. Each traffic bucket may be identified using an identifier (e.g., identifier "B1" for a first bucket, and identifier "B2" for a second bucket, etc., and "Bn" for an nth bucket). Each traffic bucket may be associated with (or mapped to) at least one node to which the portion of the network traffic is to be directed (e.g., if it satisfies the at least one matching criterion). Each node may be identified using an identifier (e.g., identifier "N1" for a first node (i.e., node 104e), identifier "N2" for a second node (i.e., node 104f), identifier "N3" for a third node (i.e., node 104g), identifier "N4" for a fourth node (i.e., node 104h), etc., and "Nm" for an mth bucket). The identifier for the bucket may be associated with the identifier for the node. For example, the association (or mapping) may be a data structure (e.g., an identifier such as an 'int' primitive data type, a hyperlink, an entry in a database, a ternary content-addressable memory (TCAM) entry, and the like) used to implement the at least one matching criterion. In a particular example, a TCAM entry specifies matching criteria and instructions operable to (or any suitable indicator usable to) determine whether to permit (e.g., forward) or deny (e.g., block and/or not forward) packets that meet the matching criteria. Each traffic bucket may be used to classify network traffic. When a packet is received (e.g., by network element 108g of FIG. 1 and/or by network element 108 of FIG. 2), data can be retrieved from the packet and compared against the matching criterion to determine which traffic bucket of a plurality of traffic buckets corresponds to the packet. For example, if a packet satisfies the matching criteria included in a traffic bucket, then the packet is determined to correspond to the traffic bucket (and/or the traffic bucket is identified based on the packet satisfying the matching criterion). A traffic bucket may be implemented as an access control lists (ACLs) and matching entries may be implemented as ACL entries. In other examples, a traffic bucket may be implemented as a ternary content-addressable memory (TCAM) entry (e.g. stored in memory 218 of FIG. 2) or a portion of a TCAM entry (e.g., a Mask, Value, and Result (MVR) entry.

A matching criterion identifies a subset of network traffic (e.g., based on attributes of the network traffic, attributes of packets comprising the network traffic, and/or the network element at which the packet is received). Any suitable matching criteria may be specified, such as one or more identifiers associated with a field of a packet (e.g., a source field, a destination field, an opcode field, a protocol), a port associated with the packet, a number of bits in the packet, a bit in a particular bit position of one or more fields of the packet, a hash of one or more fields of the packet (e.g., generated by executing a hashing function on the one or more fields of the packet), and the like. Such an identifier may include a network address, an Internet Protocol (IP) address (e.g., a source and/or destination IP address), a MAC address (e.g., a source and/or destination MAC addresses), a port identifier (e.g., an inbound port at which the packet is received, an outbound port on which the packet is transmitted/forwarded), a protocol, and/or any numeric (or alphanumeric) identifier.

Matching criterion may identify a single attribute or a group of attributes for use in identifying the portions of network traffic. In some cases, a traffic bucket may specify a hierarchy of matching criteria (e.g., using a tree structure) for application to a packet. Thus, when a matching criterion identifies a group of attributes, each member of the group may be applied to a packet in a sequence specified by the hierarchy. In some embodiments, the matching criterion may identify network traffic received from a single port. In other embodiments, the same matching criterion may identify network traffic received from multiple ports. In further embodiments, the matching criteria include one or more protocols associated with a packet. For example, the matching criterion may identify packets associated with a single protocol (e.g., Hypertext Transfer Protocol [HTTP] packets) or identify packets associated with multiple protocols (e.g., HTTP packets, Secure Sockets Layer [SSL] packets, and File Transfer Protocol [FTP] packets). In cases where the matching criterion identifies a group of attributes, the association (or mapping) between a node and a traffic bucket (including the matching criteria) may specify a single set of instructions for application to the single member and/or or all members of the group (e.g., for application to a single protocol and/or to multiple protocols).

In a particular example, a plurality of traffic buckets corresponds to mutually exclusive and collectively exhaustive partitions of network traffic received by the network element. Each traffic bucket of the plurality of traffic buckets may correspond to a mutually exclusive portion of the network traffic received by the network element (with respect to other traffic buckets). The plurality of traffic buckets is collectively exhaustive with respect to all of the network traffic received by the network element. Because the traffic buckets apply to mutually exclusive portions of network traffic, this reduces the likelihood of (or prevents) situations where two or more traffic buckets apply to a same portion of network traffic (e.g., and result in different determinations regarding whether to permit or deny a packet). As an example, a traffic bucket may include a matching criterion that identifies a particular port (e.g., a first port of a plurality of ports) on which a packet is received by the network element (e.g., by network element 108g of FIG. 1 and/or by network element 108 of FIG. 2). In such an example, only one bucket may correspond to packets received on the first port of the network element and another bucket may correspond to packets received on packets received on a second port of the network element. These buckets apply to mutually exclusive portions of traffic since a packet can only be received on a single port. In this example, the bucket is mutually exclusive with respect to a single matching criterion (which, in this case, is an attribute of the packet). However, a bucket may be mutually exclusive with respect to a plurality of matching criterion (i.e., a matching criteria). Thus, a single packet may be compared against a plurality of matching criterion, each of which applies to a different attribute of the packet (e.g., where each of the matching criterion are mutually exclusive with respect to another matching criterion).

Each of network elements 108a-h may be any device or system operable to simultaneously redirect and load-balance traffic (e.g., based on customized service policies). For example, network elements may include network switches, routers, servers (physical servers or servers virtually implemented on physical hardware), machines (physical machine or machines virtually implemented on physical hardware), end user devices, access points, cable boxes, gateways, bridges, load-balancers, firewalls, inline service nodes, proxies, processors, modules; other suitable devices, components, elements, proprietary appliances, or objects operable to exchange, receive, and transmit information in a network environment; or a combination of two or more of these. A network element may include any suitable hardware, software, components, modules, interfaces, or objects that facilitate operations associated with utilizing user-specified access control lists in conjunction with redirection and load-balancing. This may be inclusive of appropriate algorithms and communication protocols that allow for the effective exchange of data or information. Network elements 108a-h may be deployed as a redirection and load-balancing node within a data center, a core network, or in another suitable configuration.

Each of network nodes (or 'nodes') 104a-k may be any device or system operable to exchange, transmit, and or receive information in a network environment. For example, network nodes may include network switches, routers, servers (physical servers or servers virtually implemented on physical hardware) (e.g., servers 104e-h), machines (physical machine or machines virtually implemented on physical hardware), end user devices (such as tablet 104b, desktop computer 104d, smartphone 104a, and IP phone 104c), access points (e.g., 104i-k), cable boxes, gateways, bridges, load-balancers, firewalls, inline service nodes, proxies, processors, modules; or any other suitable devices, components, elements, proprietary appliances, objects operable to exchange, receive, and transmit information in a network environment; or a combination of two or more of these. A network node 104 may include any suitable hardware, software, components, modules, interfaces, or objects that facilitate its communications operations. This may be inclusive of appropriate algorithms and communication protocols that allow for the effective exchange of data or information. A node may be any device identifiable, in a network, by an address. A node can be a source or a destination of a data packet (e.g., where the address of the node may be contained in a source/destination field of the data packet to indicate that the node is the source/destination of the packet).

A network node 104 or a network element 108 may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein and/or provide functionality described or illustrated herein. The components of the one or more computer systems may comprise any suitable physical form, configuration, number, type, and/or layout. Where appropriate, one or more computer systems may be unitary or distributed, span multiple locations, span multiple machines, or reside in a cloud, which may include one or more cloud components in one or more networks.

The networks 102 and 106 represents a series of points, nodes, or network elements of interconnected communication paths for receiving and transmitting packets of information that propagate through a communication system. A network offers a communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium. In some embodiments, a network may simply comprise a cable (e.g., an Ethernet cable), air, or other transmission medium. The Internet network 106 and the public switched telephony network (PSTN) 107 may include other hosts (not illustrated), which may transmit network traffic to and receive network traffic from any host 104 in network 102.

Figures 2, 3A, 3B:
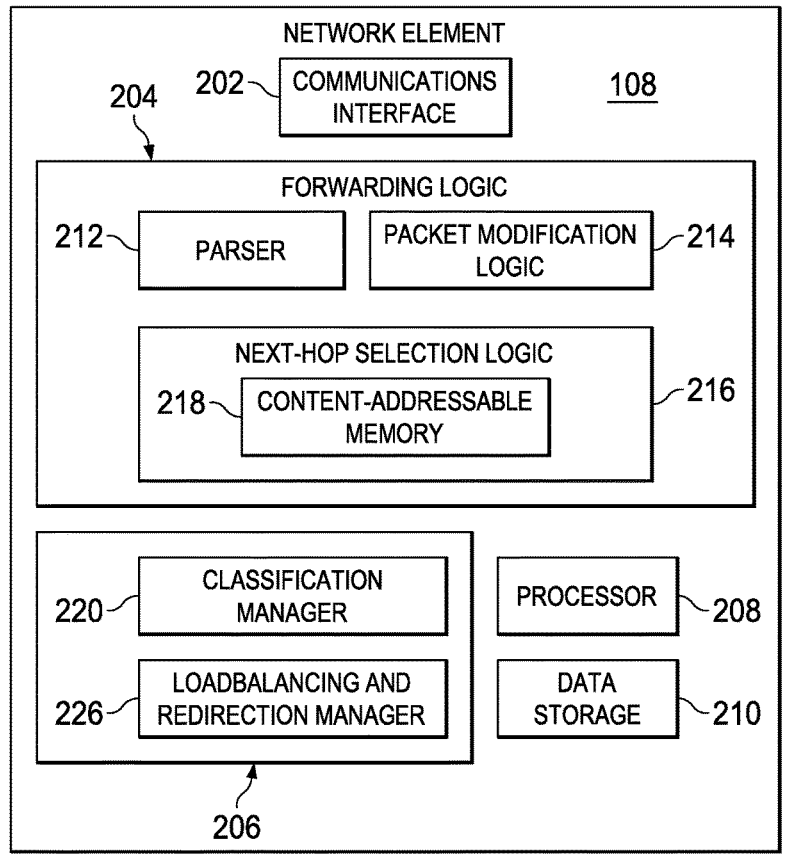
FIG. 2 illustrates a block diagram of a network element in accordance with certain embodiments.
FIGS. 3A and 3B illustrate example mappings between nodes and partitions of network traffic based on a service policy.

FIG. 2 illustrates a block diagram of a network element 108 in accordance with certain embodiments. In the embodiment depicted, network element 108 includes a computer system to facilitate performance of its operations. Such operations may include the network element 108 filtering data packets by controlling, based on one or more traffic buckets, whether the packets are permitted or denied. In particular embodiments, a computer system may include a processor, memory, storage, one or more communication interfaces, and a display. As an example, network element 108 comprises a computer system that includes one or more communication interfaces 202, forwarding logic 204, memory 206, one or more processors 208, and data storage 210. These components may work together in order to provide functionality described herein. It is notes that the network element 108 of FIG. 2 is an example of network element 108g of FIG. 1.

The one or more communication interfaces 202 may be used for the communication of signaling and/or data between network element 108 and one or more networks (e.g., 102, 106, 107) and/or network nodes 104 coupled to a network 102. For example, communication interface 202 may be used to send and receive data packets. Each communication interface 202 may send and receive data and/or signals according to a distinct standard such as Asynchronous Transfer Mode (ATM), Frame Relay, or Gigabit Ethernet (or other IEEE 802.3 standard). In a particular embodiment, communication interface 202 comprises one or more ports that may each function as an ingress and/or egress port. As one example, communication interface 202 may comprise a plurality of Ethernet ports.

The forwarding logic 204 may be operable to load-balance traffic received via the one or more communication interfaces 202, redirect the traffic to a new destination (e.g., redirecting a data packet from a first address contained in a field of the data packet to a second address), and forwarding the traffic to the new destination using the one or more communication interfaces 202. In some cases, the forwarding logic 204 may implement user-specified policies for defining the new destination for load-balancing and redirecting. The forwarding logic 204 is associated with a content-addressable memory 218 (e.g., a ternary content-addressable memory [TCAM]). A load-balancing and redirection manager 226 may program the content-addressable memory 218 based on traffic buckets (e.g., wherein the traffic buckets are generated by a classification manager 220). In the embodiment depicted, forwarding logic 204 includes next-hop selection logic 216, parsing logic 212, and packet modification logic 214. In various embodiments, any suitable portion of forwarding logic 204 may comprise fixed logic or programmable logic (e.g., software/computer instructions executed by the processor), such as a programmable processor, programmable digital logic (e.g., an FPGA, an EPROM, an EEPROM) or an ASIC that includes digital logic, software, code, electronic instructions, or any suitable combination thereof. In a particular embodiment, forwarding logic 204 comprises an ASIC that is operable to perform traffic forwarding in hardware by utilizing logic (e.g., one or more memories such as memory 218 and/or a TCAM) that is reprogrammable by an entity (e.g., an operating system and/or load-balancing and redirection manager 226) based on simultaneous redirecting and load-balancing information (e.g., stored in tables that map nodes to buckets, received from a network administrator, and the like). The forwarding logic 204 may be encoded in one or more non-transitory, tangible media. For example, the logic 204 may be stored on a computer-readable non-transitory medium comprising one or more instructions that, when executed on a processor, configure the processor to perform logic 500, logic 600, both logic 500 and logic 600, or any portion of the forgoing (and further operate other components of the network element 108).

Parsing logic 212 may be operable to parse packets received from the ingress ports of network element 108 (e.g., via communications interface 202). The parsing logic 212 may be configured to parse any necessary information from a received packet. For example, the parsing logic 212 may be configured to parse one or more fields of the packets, one or more protocols associated with the packet, a source IP address of the packet, a source MAC address of the packet, a destination IP address of the packet, a destination MAC address of the packet, or other suitable information (e.g., corresponding to matching criteria) from the packet. In some embodiments, the parsing logic 212 is configured to parse information based on the information stored in entries in the memory 218. The parsing logic 212 may be configured on a port-by-port basis, such that packets from each port may be parsed based on the entries associated with that port. The parsed information is passed to next hop selection logic 216.

Next-hop selection logic 216 is operable to receive entries and parsed information and can configure itself to implement the entries. For example, next hop selection logic 216 may store, in the content addressable memory 218 (e.g., TCAM), an entries associated with one or more traffic buckets. When a packet is received, information parsed from the packet by parsing logic 212 (and any other suitable information associated with the packet) may be passed to the next hop selection logic 216. The next hop selection logic 216 compares the parsed information to entries in the memory 218 (e.g., which may comprise performing a lookup in the memory 218). If the parsed information matches an entry in the memory, a result of the match is passed to the packet modification logic 214 (e.g., a Result portion of the entry is passed to the logic 214, wherein the entry is a Mask, Value, Result (MVR) entry stored in TCAM memory). Such a Result can include instructions regarding how to handle whether to permit (e.g., forward, redirect) or deny (e.g., block, not forward) the packet. For example, the Result portion can include an instruction to rewrite a destination field of the packet to a new destination (e.g., where the instruction identifies a specific network address to be the new destination). In a particular example, the packet modification logic 214 may rewrite a destination field of the data packet from a first address to a second address (e.g., where the second address corresponds to a node identified based on the matching entry in the memory 218). The packet modification logic 214 may modify the appropriate fields of the packet (e.g., destination IP address and/or destination MAC address). The packet may be forwarded to the new address (or the second address) out of an appropriate egress port of network element 108.

Memory 206 and/or data storage 210 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 206 and/or data storage 210 may store any suitable data or information utilized by network element 108, including software embedded in a computer readable medium, and/or encoded logic incorporated in hardware or otherwise stored (e.g., firmware). Memory 206 and/or data storage 210 may also store the results and/or intermediate results of the various calculations and determinations performed by processor 202. A memory element used to store logic 204 may be similar to memory 206. In certain example implementations, the simultaneous redirecting and load-balancing functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. Any of the memory items discussed herein should be construed as being encompassed within the broad term 'memory element.' Similarly, any of the potential processing elements, modules, and machines described in this Specification should be construed as being encompassed within the broad term 'processor.'

Processor 208 may be a microprocessor, controller, or any other suitable computing device, resource, or combination of hardware, stored software and/or encoded logic operable to provide, either alone or in conjunction with other components of network element 108, network element functionality. In some embodiments, network element 108 may utilize multiple processors to perform the functions described herein.

The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one implementation, the network element 108 described herein may include software to achieve (or to facilitate) the functions discussed herein for simultaneously redirecting and load-balancing traffic where the software is executed on one or more processors 208 to carry out the functions. This could include the implementation of one or more instances of an operating system, classification manager 220 (e.g., access control list (ACL) manager), load-balancing and redirection manager 226, and/or any other suitable elements that would foster the activities discussed herein. In other embodiments, one or more of these elements may be implemented in hardware and/or firmware such as reprogrammable logic in an ASIC.

An operating system may be capable of communicating a service policy received from the network administrator to other portions of network element 108 (e.g., to classification manager 220, load-balancing and redirection manager 226, and/or forwarding logic 204). In particular embodiments, the operating system is operable to program logic of network element 108 based on the service policy received from the network administrator.

Memory 206 comprises a classification manager 220 and a load-balancing and redirection manager 226. The classification manager 220 manages traffic buckets related to network traffic. The load-balancing and redirection manager 226 manages mappings between traffic buckets and nodes (e.g., and programs the content-addressable memory 218 based on the mappings).

The classification manager 220 manages traffic buckets related to network traffic. For example, the classification manager 220 may generate and/or destroy traffic buckets. The classification manager 220 may generate the traffic buckets based on input received from any suitable entity, such as a network administrator, a node, or various features of network element 108. The input may define at least one matching criterion. The classification manager may generate a traffic bucket that includes the at least matching criterion. Alternatively, the classification manager may generate a plurality of buckets, where each bucket corresponds to a different one of the at least one criterion. In other examples, the input comprises a number of buckets (or a number of nodes). The classification manager may generate any suitable matching criteria to partition network traffic into a number of subsets that matches the number of buckets (or the number of nodes). For example, the classification manager 220 can use the number of buckets (or the number of nodes) to set a number of hash values output by a hash function. The classification manager 220 can generate traffic buckets including matching criteria that correspond to the hash values. The classification manager 220 can execute the hash function on one or more fields of a packet to determine a hash value for the packet. As an example, the classification manager may apply a hashing function to any field or attribute of the packet (e.g., source address, destination address, source port, destination port, protocol, any other criteria, and/or any L2/L3 header field) to classify each packet into one of a number of buckets. The packet may be associated with the traffic bucket that corresponds to the hash value for the packet. In other examples, the input comprises a traffic bucket. In still other examples, the input may comprise a service policy. A service policy is inclusive of an instruction to redirect traffic to one or more nodes based on one or more matching criterion. As an example, a user may configure a service policy that identifies at least one matching criterion (which may be identified using a reference to an identifier for the service policy such as a link), an ingress interface (e.g., a particular interface on which traffic is received; may be one of a plurality of interfaces), and a list of nodes to which to redirect traffic (e.g., a network address for each node). In such an example, the service policy may be received (e.g., by the classification manager 220) as input having the form: service policy <service-policy-identifier>, ingress interface <interface-identifier>, device-group <node-pool-identifier>. A service policy may be utilized to simultaneously redirect and load-balance traffic by leveraging forwarding tables. Each service policy may be identified by an identifier (i.e., a service policy identifier) such as "S1" for a first service policy, "S2" for a second service, etc., and Sn for an nth service policy. Any traffic arriving on the ingress interface identified in the input can be subject to the at least one matching criterion of the service policy. The classification manager 220 may store an association between the ingress interface and the service policy (and/or an identifier corresponding to the service policy). The service policy results in generation of one or more traffic buckets that codify the matching criterion of the service policy (a translation/parsing logic may be used to parse the contents of a service policy and output a corresponding traffic bucket). Service policy may include other criteria and/or instructions regarding how to handle traffic that matches the matching criterion. Regardless of the approach to generating the traffic buckets, the classification manager stores the traffic buckets in a memory element. A traffic bucket may be transmitted (by the classification manager 220) to the load-balancing and redirection manager 226. Since a service policy may include instructions regarding how to handle traffic that matches the matching criterion, the classification manager 220 may transmit to the load-balancing and redirection manager 226 the instructions and/or the service policy ID (e.g., for use in generating mappings between traffic buckets nodes).

The load-balancing and redirection manager 226 manages mappings between traffic buckets and nodes (e.g., and programs the content-addressable memory 218 based on the mappings). The load-balancing and redirection manager 226 receives traffic buckets from the classification manager 220 and may also receive identifiers of nodes corresponding to each of the traffic buckets. The traffic buckets are load-balanced to the nodes (e.g., by mapping or otherwise assigning the traffic buckets to a specific node the set of nodes). Such load-balancing may be implemented in a static (or dynamic) table including entries that map the nodes to the buckets. For each pairing (of traffic bucket and a corresponding node), the manager 226 may generate an instruction to redirect, to the corresponding node, a data packet that satisfies the matching criteria of the traffic bucket. The manager 226 associates each of the traffic buckets with the node. The association may comprise an entry comprising an identifier of the node, an identifier of the bucket, the matching criteria associated with the traffic bucket, and/or the instruction to redirect. In some examples, the association may be a Mask, Value, and Result (MVR) entry, where the Result portion of the entry comprises the instruction to redirect. The MVR entry may be stored in the memory 218. Network traffic is load-balanced by partitioning the traffic based on the buckets and only forwarding a corresponding partition of the traffic to a node with which the bucket is associated. The associations between buckets and nodes may be generated one-to-one and/or many-one associations between nodes and buckets. By creating multiple buckets, each bucket can be mapped to a different node. With multiple nodes, it is possible to establish multiple associations (between buckets and nodes), which are utilized to load-balance and redirected traffic to multiple nodes.

Note that the load-balancing and redirection manager 226 may determine a number of buckets to generate (i.e., for mapping to the nodes) by retrieving data from any suitable entity, such as a network administrator (e.g., by receiving an input), redirection manager 220, a node, a third-party system, or various features of network element 108. Such a determination may be made prior to generating the buckets (and may be transmitted to the classification manager 220). As many traffic buckets can be created as needed for granularity. For example, increasing the number of buckets enables a more detailed (or more granular) level of control of the load-balancing of the traffic than what is possible with a smaller number of buckets. However, the number of buckets should not be so large as to effectively make each packet a distinct bucket. Instead, any traffic that is to be load-balanced is partitioned into subsets that help to ensure a reason level of distribution to the nodes (e.g., an approximately even level of distribution of packets). In some cases, the classification manager 220 may determine the number of buckets based on the number of nodes (e.g., equal to the number of node, or choose a that is a factor of the number of nodes). In some examples, the number of buckets is selected to be equal to the number of nodes. In such a case, a one-to-one mapping may be generated between the nodes and buckets (e.g., each node in the list of nodes is mapped to one bucket). In other examples, the number of buckets is selected to be greater than the number of nodes. In such a case, a one-to-many mapping may be generated between the nodes and buckets (e.g., each node in the list of nodes is mapped to more than one bucket). In still other examples, the number of buckets is selected to be less than the number of nodes. In such a case, since the number of buckets is less than the number of nodes, any mapping between the buckets of nodes would not take full advantage of distributing the traffic load across all the available nodes. Thus, when it is determined that the number of buckets is less than the number of nodes, the buckets may be further partitioned (e.g., by load-balancing and redirection manager 226) to generate a number of buckets that is greater than or equal to the number of nodes. The load-balancing and redirection manager 226 may generate a mapping between nodes and buckets (e.g., using a load-balancing logic). The mappings (e.g., one-to-one or one-to-many) are as described further below.

Turning to FIGS. 3A and 3B, FIGS. 3A and 3B illustrate example mappings between nodes and buckets that are generated based on a service policy. In particular, table 302 in FIG. 3A illustrates an exemplary one-to-one mapping between the nodes and buckets. The table 302 includes rows 304a-e. Each row includes three fields: a first field corresponds to a service policy identifier, a second field corresponds to an identifier of a bucket, and a third field corresponds to an identifier of a node. In this example, there are 'n' number of buckets and 'm' number of nodes (e.g., where each of n and m is an integer greater than zero). In some examples, where m and n are equal to one another, the number of buckets is equal to the number of nodes. In other examples, where m and n are not equal to one another, the number of buckets is not equal to the number of nodes. Each of rows 304a-e stores a mapping (or association) between a bucket and a node and further identifies the service policy from which the mapping was created. For example, row 304a stores a mapping between bucket "B1" and node "N1" and was generated based on service policy "S1"; row 304b stores a mapping between bucket "B2" and node "N2" and was generated based on service policy "S1"; row 304c stores a mapping between bucket "B3" and node "N3" and was generated based on service policy "S1"; row 304d stores a mapping between bucket "B4" and node "N4" and was generated based on service policy "S1"; and row 304b stores a mapping between bucket "Bn" and node "Nm" and was generated based on service policy "S1". In this example, each node is mapped to only one bucket and, therefore, represents a one-to-one mapping between the nodes and buckets.

Table 306 in FIG. 3B illustrates an exemplary one-to-many mapping between the nodes and buckets. The table 306 includes rows 308a-e. Each row includes three fields: a first field corresponds to a service policy identifier, a second field corresponds to an identifier of a bucket, and a third field corresponds to an identifier of a node. In this example, there are 'n' number of buckets and 'm' number of nodes (e.g., where n is an integer greater than zero, m is an integer greater than zero, and n is greater than m). Thus, the number of buckets is greater than the number of nodes. Each of rows 308a-e stores a mapping between a bucket and a node and further identifies the service policy from which the mapping was created. For example, row 308a stores a mapping between bucket "B1" and node "N1" and was generated based on service policy "S1"; row 308b stores a mapping between bucket "B2" and node "N1" and was generated based on service policy "S1"; row 308c stores a mapping between bucket "B3" and node "N2" and was generated based on service policy "S1"; row 308d stores a mapping between bucket "B4" and node "N2" and was generated based on service policy "S1"; row 308e stores a mapping between bucket "Bn" and node "Nm" and was generated based on service policy "S1". In this example, each of nodes N1 and N2 are mapped to more than one bucket and node Nm is mapped to one bucket. Thus, because each node may be mapped to more than one bucket, the table 306 represents a one-to-many mapping between the nodes and buckets.

For each mapping (e.g., any one or more of rows 304a-e and/or rows 308a-e), the load-balancing and redirection manager 226 redirects, based on a traffic bucket, a data packet from a first address contained in a field of the data packet to a second address that corresponds to a node. The node may be associated with a traffic bucket via the mapping. For example, the load-balancing and redirection manager 226 may generate an instruction to redirect the data packet to the node (e.g., using a redirection logic). The load-balancing and redirection manager 226 may instruct that entries be programmed into a ternary content-addressable memory (TCAM) (e.g., memory 218) of the next-hop selection logic 216 (e.g., by calling a hardware driver associated with the TCAM). For example, the load-balancing and redirection manager 226 may program a TCAM to include a Mask, Value, Result (MVR) entry that corresponds to each mapping (e.g., one MVR for each row of the table 302 or 306). The MVR entries may be stored in memory 218. For each MVR entry, the Mask and/or Value portion of the MVR may be generated based on the matching criteria comprised in a traffic buck and the Result portion of the MVR may be an instruction (generated by the load-balancing and redirection manager 226) to redirect a packet to a new destination. The new destination is a node identified in the mapping between the traffic buck and the node (e.g., stored as a network address of the node). When the mappings have been programmed into the memory 218 as MVR, the memory may be utilized to look up a particular packet (e.g., using the Mask and/or Value portion of the MVR) and retrieve a corresponding Result portion of the MVR. The Result may be the instruction to rewrite a destination field of a packet to the new destination (e.g., rewrite a destination field of the packet from the first address to a second address). The second address is retrieved from the MVR based on the traffic bucket (e.g., since each MVR is generated based, at least in part, on a traffic bucket). The packet modification logic 214 may implement the instruction to rewrite the destination field of the packet to the new destination.

Figure 4A:
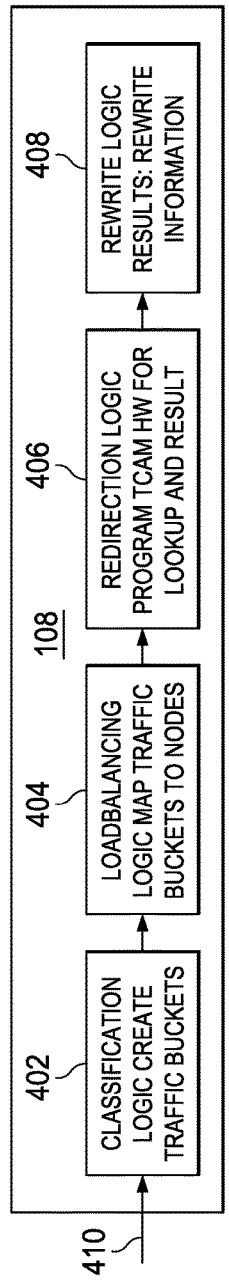
FIGS. 4A and 4B illustrate an example operation of a network element when simultaneously redirecting and load-balancing network traffic in accordance with certain embodiments.
Figure 4B:
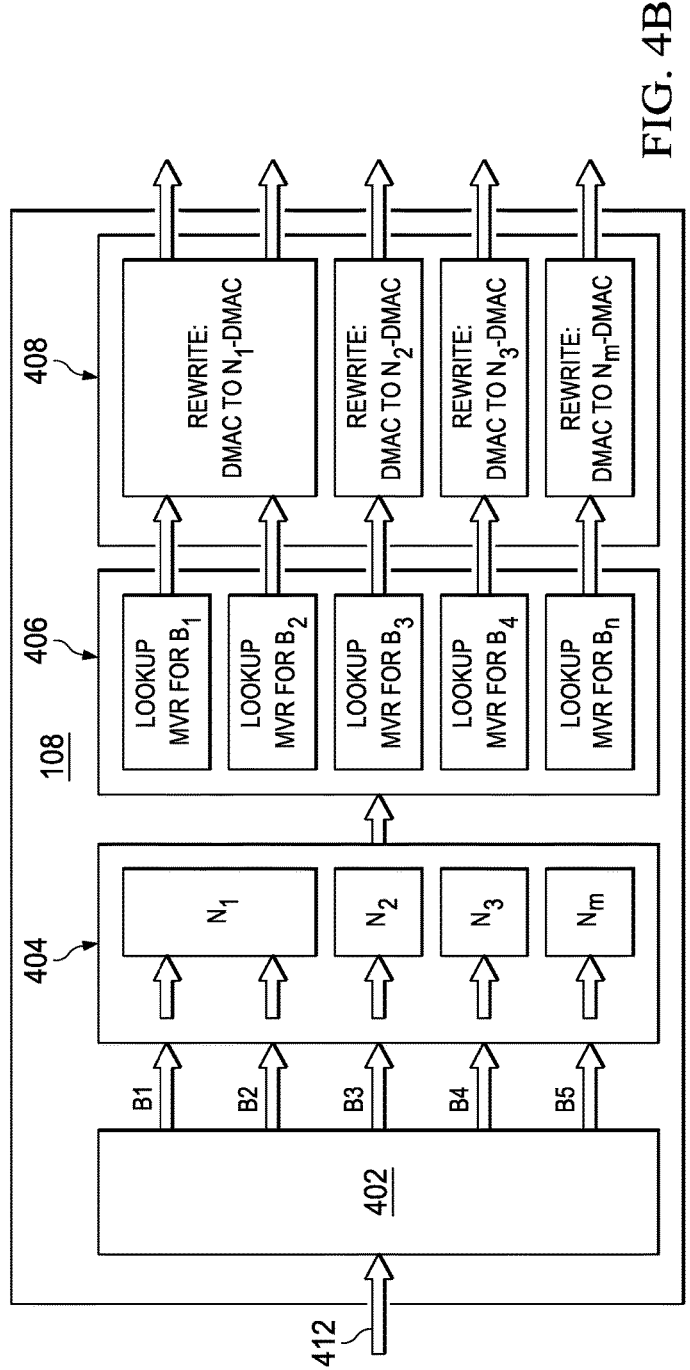

FIGS. 4A and 4B illustrate example operation of the network element 108 when simultaneously redirecting and load-balancing network traffic in accordance with certain embodiments. Turning to FIG. 4A, FIG. 4A illustrates an example operation of the network element when generating a plurality of TCAM entries (e.g., MVR entries stored in the TCAM) that implement simultaneous redirecting and load-balancing of network traffic. In FIG. 4A, the network element 108 includes classification logic 402, load-balancing logic 404, redirection logic 406, and rewrite logic 408. The network element 108 receives input 410. The input 410 defines matching criteria and identifies plurality of nodes. As an example, the matching criteria may include a network address (e.g., to be compared to the destination field of the packet) or any other matching criterion. The classification logic 402 may perform operations similar to those described with respect to classification manager 220 (FIG. 2). As an illustrative example, the classification logic 402 may determine a number of buckets in which to partition the data traffic that matches the classification. The classification logic 402 generates traffic buckets based on the determined number of buckets. In some examples, the classification logic 402 outputs identifiers corresponding to each of the buckets. The identifiers (and/or a criteria defining each of the buckets) are transmitted to load-balancing logic 404. Load-balancing logic 404 maps the buckets to the plurality of nodes. For example, the logic 404 may generate a mapping between the buckets of traffic and the plurality of nodes based at least in part on the matching criteria. The mapping may comprise an entry in a database, a link, or other association between one of the plurality of nodes and the buckets. The mappings may be stored in tables such as those illustrated in FIGS. 3A and 3B (e.g., where the rows of the tables correspond to the pairings). It is noted that the tables may be stored as static tables that are dynamically updated. For example, network probes may be utilized to monitor the status of each of the plurality of nodes. The network element 108 may receive, from such a network probe, node status information that identifiers whether the node is operational. For example, as nodes are added and/or removed, network probes may transmit an event notification that identifies that the nodes are added and/or removed. The tables may be updated based on the detection of events that identify the status of a node (e.g., added, or removed). When it is determined that node is removed (or loses operational status, fails), it may be removed from a table. When it is determined that one of the notes is no longer operational (e.g., has failed), the network element 108 may update the plurality of nodes to remove the failed node and may generate an updated table that that maps the buckets to the updated plurality of nodes. Likewise, when a node is added (or regains operational status), it may be added to a table. Such network probes can identify when a node fails and, therefore, may be utilized to prevent redirecting traffic to a failed node. Thus, although the tables themselves may be static, the logic 404 may be used to dynamically update the tables based on events detected in real-time (or near real-time). The load-balancing logic 404 may output the mappings for use in redirection logic 406. The redirection logic 406 may utilize the data in the mappings to generate an instruction to redirect a packet to one of the plurality of nodes. Since each packet will correspond to only one bucket (e.g., using a hash function), the one of the plurality of nodes corresponds to that one bucket. Redirection logic 406 may program the memory 218 (e.g., a Results portion of a MVR stored in TCAM) to output the instructions when it identifies a match between a packet and the one bucket (e.g., the matching criterion comprised in the bucket). For example, when it is determined that the packet matches a Value portion of a MVR in the memory 218, then a Result portion of the MVR may be retrieved from the memory 218. The instructions may be retrieved from the Result portion of the MVR. Since the redirection logic 406 is carried out for each of the mappings, a plurality of TCAM entries is generated (i.e., one corresponding to each pairing). The rewrite logic 408 includes, in the instruction, an address of a particular node to which the one bucket is mapped. In this example, the network element 108 received an input and generated a plurality of TCAM entries that implement simultaneous redirecting and load-balancing of network traffic based on the input. In some examples, the load-balancing and redirection manager 226 they implement (in whole or in part) logic 402, 404, 406, and 408. The TCAM can process millions of simultaneous lookups and rewrites. Consequently, the TCAM may be utilized not only to simultaneously redirection and load-balancing one data packet but also to perform many of such operations in parallel (for each of a plurality of data packet).

Turning to FIG. 4B, FIG. 4B illustrates an example operation of the network element when utilizing a plurality of TCAM entries that implement simultaneous redirecting and load-balancing of network traffic. The network traffic 412 is received on an ingress interface of the network element 108. The classification logic 402 is utilized to partition the traffic 412 into traffic buckets. For example, classification logic 402 may store a matching criterion (or matching criteria) for mapping traffic to the buckets (and/or for redirecting traffic to the one or more nodes). Using such criterion, the classification logic may compare a field from each data packet in the traffic 412 to the criterion to identify a bucket corresponding to the data packet (e.g., a bucket in which the data packet belongs based on satisfying the criterion). An identifier for the bucket may be retrieved from a memory. Because the buckets are encoded in MVR entries in a CAM memory such as TCAM (as described with respect to FIG. 4A), the load-balancing logic 404 may not be actively utilized in the example of FIG. 4B (and instead the TCAM encoding of the mapping between buckets and nodes may be used). The load-balancing logic 404 is graphically depicted in FIG. 4B to illustrate that the tables may be stored in a data store. The redirection logic 406 uses the CAM memory to search for an entry that matches the identifier for the bucket. In other examples, the redirection logic 406 uses the CAM memory to search for an entry that matches the field of the data packet. Such a search may compare a Value portion of an MVR entry to search criteria (e.g., the identifier for the bucket and/or the field of the data packet). When an entry is located that matches the search criteria, a result corresponding to the entry is retrieved from the TCAM hardware (e.g., a Result portion of the MVR). The result may include a reference to a node (e.g., a node adjacent to the network element 108) and an instruction to redirect a corresponding data packet to the node (e.g., a rewrite action implemented as a Layer 2 (L2) destination MAC address rewrite). The rewrite logic 408 rewrites the destination field from a first address to a second address that corresponds to the node (e.g. rewrites the destination MAC address of the packet to a MAC address of the node). The packet is then forwarded to the node. As multiple packets arrive on the ingress interface of the network element 108, the procedures described with respect to FIG. 4B may be simultaneously repeated for each packet (e.g., some of the packets may be parallel processed using the aforementioned procedures).

Figure 5:
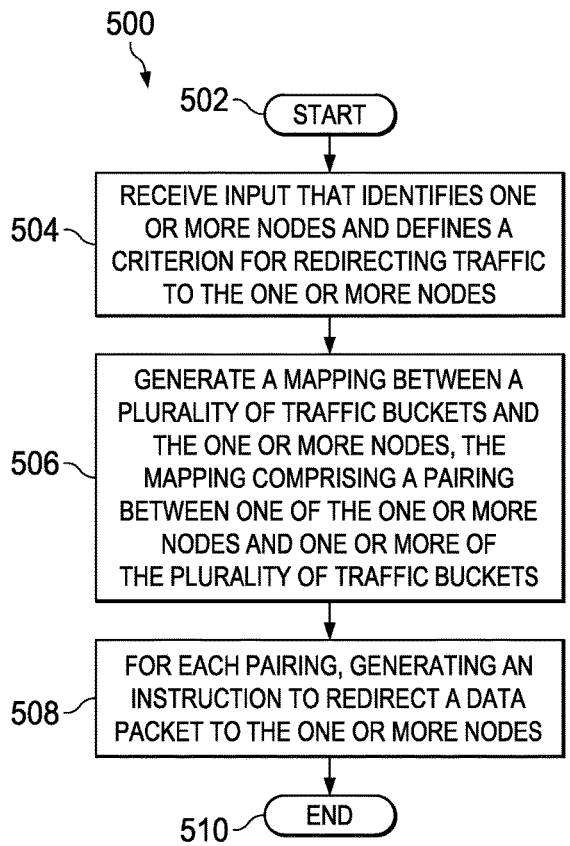
FIGS. 5 and 6 illustrate exemplary logic for simultaneously redirecting and load-balancing network traffic in accordance with certain embodiments.
Figure 6:
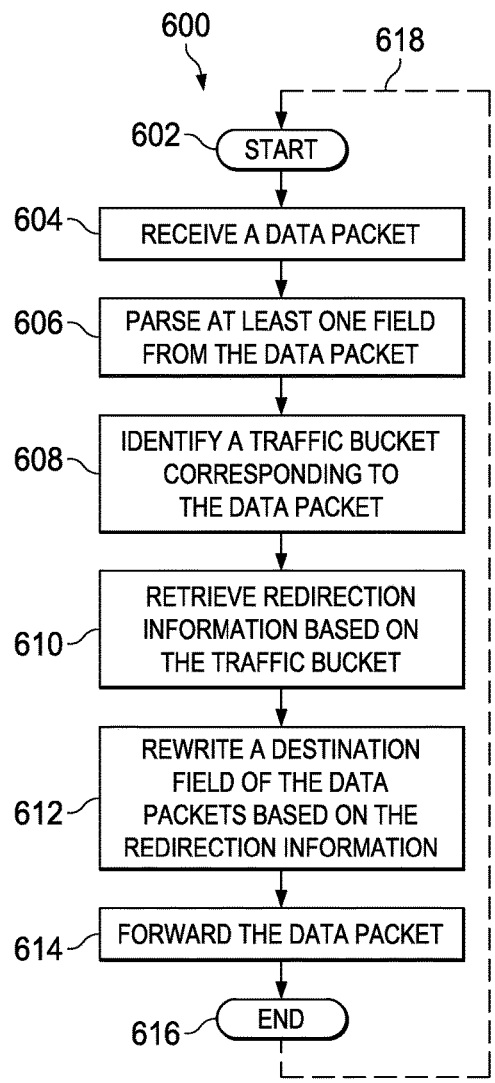

FIGS. 5 and 6 illustrate exemplary logic for simultaneously redirecting and load-balancing network traffic in accordance with certain embodiments.

Turning to FIG. 5, the logic begins at start point 502 and advances to 504. At 504, an input is received that identifies one or more nodes and defines a criterion for redirecting traffic to the one or more nodes. At 506, a mapping is generated between a plurality of traffic buckets and the one or more nodes. The mapping may comprise a pairing between one of the one or more nodes and one or more of the plurality of traffic buckets. The mapping may be generated based at least in part on the criterion. The criterion may define characteristics of the traffic that is to be distributed between each of the one or more nodes. For example, the characteristic may be a particular subnet of a network, a hash of the values in a specific range of bit numbers, or any other matching criteria. The criterion is utilized to partition the traffic into subsets (buckets). The mapping may be utilized to partition the traffic based at least in part on those characteristics (or further sub-characteristics) of the traffic. The mappings may be stored in a table. In some examples, the table is dynamically updated based on the status of a node (e.g., as discussed with respect to FIG. 4B). For example, as nodes are added and/or removed, the tables may be updated in based on the detection of events that identify the status of a node (e.g., added, or removed). When a node is removed (or fails) it may be removed from the mapping. Likewise, when a node is added (or regains operational status), it may be added to the mapping. At 508, for each paring, and instruction is generated. The instruction is inclusive of an instruction to redirect a data packet to one of the one or more nodes (e.g., based on the packet corresponding to a bucket that is mapped to the one of the one or more nodes). The logic 500 ends at end point 510.

Start point 502 and/or end point 510 may coincide with a start/end point of other logic, routines, and/or applications (e.g., start point 602 and/or end point 616). Logic 500 may be implemented in any component or combination of components of systems 100. For example, a processor operatively coupled to (or within) any of network elements 108*a-h* (e.g., FIG. 1B) may execute logic 500. In one implementation, logic 500 may be provisioned in whole or in part in network element 108 (FIG. 2).

In some examples, logic 500 is utilized to program a TCAM hardware to implement, in a lookup table, a correspondence between packets and instructions for simultaneously redirecting and load-balancing network traffic to a new destination, as disclosed herein. The logic 600 of FIG. 6 may utilize the TCAM hardware (which was programmed by logic 500) to execute the instructions on packets received by a network element.

Turning to FIG. 6, the logic 600 begins at start point 602 and advances to 604. At 604, a data packet is received. At 606, at least one field is parsed from the data packet. Information contained in the at least one field may be utilized to determined whether simultaneous redirection and load-balancing should be applied to this packet. For example, a service policy may specify that only packets received over a second port of a network element should be simultaneously redirected and load-balanced. Thus, when it is determined that the packet is received over the second port, the packet may be further compared to buckets that correspond to the service policy. However, when it is determined that the packet is received over a first port, the packet may be forwarded according a standard routing policy (and not based on the service policy). At 608, a traffic bucket that corresponds to the data packet is identified. Thus, the information contained in the at least one field may also be utilized to identify a bucket that corresponds to the packet (e.g., when it has been determined that simultaneously redirected and load-balanced should be applied to this packet). For example, an address of a source or destination may be compared to criteria that defines a plurality of buckets that partitions into subsets the network traffic associated with the service policy. Based on such a comparison, the traffic bucket corresponding to the packet may be identified. In other examples, the Information contained in the at least one field is directly used as input for a TCAM lookup. When a match is found, then the TCAM retrieves redirection information for the data packet. Once the traffic bucket that corresponds to the data packet has been identified (either explicitly or by finding a match in a TCAM lookup), an identifier for the traffic bucket may be utilized to lookup (or retrieve) redirection information for the data packet. At 610, redirection information is retrieved based on the traffic bucket. In one example, TCAM hardware is utilized to retrieve a MVR entry (e.g., MVR entry matching at least a portion of the information contained in the at least one field). The MVR entry may include (in a result portion of the MVR) an instruction to redirect data packet to a new destination. For example, when it is determined that the data packet (or a portion thereof) matches the Value portion of the MVR, then a Result portion of the MVR may be retrieved by the TCAM. An instruction to redirect the data packet to the new destination (e.g., the address of the node) may be retrieved from the Result portion of the MVR. For example, the new destination may be an address that is different from an address in a destination field of the packet, as received at 604. At 612, in a destination field of the packet (i.e., the packet as received at 604) is rewritten based on the redirection information. For example, the destination field of the packet may originally contain a first address. The destination field may be rewritten from the first address to a second address (e.g., where the second address is the new destination defined in the MVR result). In some specific examples, the address is a MAC address of a node. The rewrite action may be implemented as a Layer 2 (L2) destination MAC address rewrite. At 614, the packet is forwarded to a node identified by the new destination address. The logic 600 may end at 616.

Alternatively, the logic 600 may be iteratively executed (and/or in parallel) on each of a plurality of data packets in the network traffic, as generally indicated by 618. By identifying a traffic bucket that corresponds to each packet of a plurality of packets contained in the network traffic, the traffic is load-balanced by distributing the packets to the node that is mapped to each bucket. Moreover, the logic leverages load-balancing information to rewrite the destination of the packet prior to forwarding, and therefore, is able to simultaneously load-balance and redirect the traffic by distributing different portions of the traffic to different nodes of the plurality of nodes (i.e., load-balancing) and rewrite the destination of the traffic (i.e., redirecting) to a specific node based on the load-balancing.

Start point 602 and/or end point 626 may coincide with a start/end point of other logic, routines, and/or applications (e.g., start point 502, end point 510). Logic 600 may be implemented in any component or combination of components of systems 100. For example, a processor operatively coupled to (or within) any of network elements 108*a-h*) may execute logic 600. In one implementation, logic 600 may be provisioned in whole or in part in network element 108 (FIG. 2). In a particular example, the end point 510 coincides with start point 602 and, thereby, forms a single logic that progresses through each of the procedures and logic 500 and then progress to each of the procedures and logic 600 (and may iterate over or parallel process packets as indicated by 618).

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of simultaneously redirecting and load-balancing functions, as potentially applied to a myriad of other architectures.

It is also important to note that the steps in the Figures illustrate only some of the possible scenarios that may be executed by, or within, the network elements described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the network elements in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   accessing a table comprising a plurality of mappings between a plurality of traffic buckets and a plurality of nodes;
   receiving, at a network element, a data packet;
   identifying, by the network element from the table, a traffic bucket of the plurality of traffic buckets corresponding to the data packet, wherein traffic bucket is associated with a node of the plurality of nodes and the traffic bucket comprises a matching criterion that identifies a subset of network traffic;
   redirecting, based on the traffic bucket, the data packet from a first address contained in a destination field of the data packet to a second address that corresponds to the node forwarding the data packet to the second address; and
   dynamically updating a number of traffic buckets in the plurality of traffic buckets based on real-time data associated with the node, wherein subsequent packets that are associated with the node are redirected to a third address instead of the second address based on the dynamic update.

2. The method of claim 1, further comprising:
   receiving an input identifying the node and defining the traffic bucket;
   generating a mapping of the plurality of mappings between the traffic bucket and the node; and
   generating an instruction to redirect a corresponding data packet to the node.

3. The method of claim 1, further comprising
receiving an input of a service policy, wherein the service policy identifies the plurality of nodes and defines matching criteria for redirecting traffic to the plurality of nodes;
generating the plurality of mappings between the plurality of traffic buckets and the plurality of nodes, each of the plurality of mappings comprising one of the plurality of nodes and one or more of the plurality of traffic buckets; and
for each of the plurality of mappings, generating an instruction to redirect a corresponding data packet to the plurality of nodes.

4. The method of claim 2, wherein the generating the instruction comprises:
generating a Mask, Value, Result (MVR) entry based on the node and the traffic bucket, wherein the Result portion of the comprises an instruction to redirect the data packet to the node;
generating a Value portion of the MVR based on the matching criterion comprised in the traffic bucket; and
storing the MVR entry in a ternary content-addressable memory (TCAM).

5. The method of claim 4, wherein the identifying the traffic bucket corresponding to the data packet comprises:
when it is determined that the data packet corresponds to the Value portion of the MVR, retrieving the Result portion of the MVR; and
retrieving, from the Result portion of the MVR, the instruction to redirect the data packet to the node.

6. The method of claim 5, wherein the determining that the data packet corresponds to the Value portion of the MVR comprises:
executing a hashing function on the destination field of the data packet to generate a hash value;
comparing, by the TCAM, the hash value to the Value portion of the MVR; and
determining that the hash value matches Value portion of the MVR.

7. A network element comprising:
at least one memory element;
at least one processor operably coupled to the at least one memory;
a load-balancing and redirection manager comprising one or more instructions, that when executed by the at least one processor configure the at least one processor to perform operations comprising:
accessing a table comprising a plurality of mappings between a plurality of traffic buckets and a plurality of nodes;
receiving a data packet;
identifying, from the table, a traffic bucket of the plurality of traffic buckets corresponding to the data packet, wherein traffic bucket is associated with a node of the plurality of nodes and the traffic bucket comprises a matching criterion that identifies a subset of network traffic;
redirecting, based on the traffic bucket, the data packet from a first address contained in a destination field of the data packet to a second address that corresponds to the node forwarding the data packet to the second address; and
dynamically updating a number of traffic buckets in the plurality of traffic buckets based on real-time data associated with the node, wherein subsequent packets that are associated with the node are redirected to a third address instead of the second address based on the dynamic update.

8. The network element of claim 7, wherein the operations further comprise:
receiving an input identifying the node and defining the traffic bucket;
generating a mapping of the plurality of mappings between the traffic bucket and the node; and
generating an instruction to redirect a corresponding data packet to the node.

9. The network element of claim 7, wherein the operations further comprise:
receiving an input of a service policy, wherein the service policy identifies the plurality of nodes and defines matching criteria for redirecting traffic to the plurality of nodes;
generating the plurality of mappings between the plurality of traffic buckets and the plurality of nodes, each of the plurality of mappings comprising one of the plurality of nodes and one or more of the plurality of traffic buckets; and
for each of the plurality of mappings, generating an instruction to redirect a corresponding data packet to the plurality of nodes.

10. The network element of claim 8, wherein the generating the instruction comprises:
generating a Mask, Value, Result (MVR) entry based on the node and the traffic bucket, wherein the Result portion of the comprises an instruction to redirect the data packet to the node;
generating a Value portion of the MVR based on the matching criterion comprised in the traffic bucket; and
storing the MVR entry in a ternary content-addressable memory (TCAM).

11. The network element of claim 10, wherein the identifying the traffic bucket corresponding to the data packet comprises:
when it is determined that the data packet corresponds to the Value portion of the MVR, retrieving the Result portion of the MVR; and
retrieving, from the Result portion of the MVR, the instruction to redirect the data packet to the node.

12. The network element of claim 11, wherein the determining that the data packet corresponds to the Value portion of the MVR comprises:
executing a hashing function on the destination field of the data packet to generate a hash value;
comparing, by the TCAM, the hash value to the Value portion of the MVR; and
determining that the hash value matches Value portion of the MVR.

13. A computer-readable non-transitory medium comprising one or more instructions that, when executed on a processor, configure the processor to perform one or more operations comprising:
accessing a table comprising a plurality of mappings between a plurality of traffic buckets and a plurality of nodes;
receiving, at a network element, a data packet;
identifying, by the network element from the table, a traffic bucket of the plurality of traffic buckets corresponding to the data packet, wherein traffic bucket is associated with a node of the plurality of nodes and the traffic bucket comprises a matching criterion that identifies a subset of network traffic;

redirecting, based on the traffic bucket, the data packet from a first address contained in a destination field of the data packet to a second address that corresponds to the node forwarding the data packet to the second address; and dynamically updating a number of traffic buckets in the plurality of traffic buckets based on real-time data associated with the node, wherein subsequent packets that are associated with the node are redirected to a third address instead of the second address based on the dynamic update.

14. The medium of claim 13, further comprising:

receiving an input identifying the node and defining the traffic bucket;

generating a mapping of the plurality of mappings between the traffic bucket and the node; and generating an instruction to redirect a corresponding data packet to the node.

15. The medium of claim 14, wherein the generating the instruction comprises:

generating a Mask, Value, Result (MVR) entry based on the node and the traffic bucket, wherein the Result portion of the comprises an instruction to redirect the data packet to the node;

generating a Value portion of the MVR based on the matching criterion comprised in the traffic bucket; and storing the MVR entry in a ternary content-addressable memory (TCAM).

16. The medium of claim 15, wherein the identifying the traffic bucket corresponding to the data packet comprises:

when it is determined that the data packet corresponds to the Value portion of the MVR, retrieving the Result portion of the MVR; and retrieving, from the Result portion of the MVR, the instruction to redirect the data packet to the node.

17. The medium of claim 16, wherein the determining that the data packet corresponds to the Value portion of the MVR comprises:

executing a hashing function on the destination field of the data packet to generate a hash value;

comparing, by the TCAM, the hash value to the Value portion of the MVR; and determining that the hash value matches Value portion of the MVR.

18. The method of claim 1, wherein the redirecting, based on the traffic bucket, the data packet from the first address contained in the destination field of the data packet to the second address that corresponds to the node comprises:

retrieving the second address based on the traffic bucket, and rewriting the destination field of the data packet from the first address to the second address.

19. The method of claim 1, wherein the dynamically updating the number of traffic buckets in the plurality of traffic buckets based on the real-time data associated with the node comprises:

receiving the real-time data comprising status information associated with the node; and increasing, based on the status information, the number of traffic buckets by creating a new traffic bucket associated with the third address.

20. The method of claim 1, wherein the dynamically updating the number of traffic buckets in the plurality of traffic buckets based on real-time data associated with the node comprises:

receiving the real-time data comprising status information associated with the node;

determining that the number of traffic buckets is less than a number the plurality of nodes based, at least in part, on the status information; and partitioning one or more of the plurality of traffic buckets into multiple traffic buckets based on the determining.

\* \* \* \* \*